United States Patent [19]
Buteux

[11] 3,800,022
[45] Mar. 26, 1974

[54] PROCESS FOR THE PRODUCTION OF NEW ORIENTED FILM AND TAPES

[75] Inventor: Richard Harold Barclay Buteux, Welwyn Garden City, England

[73] Assignee: Imperial Chemical Industries Limited, London, England

[22] Filed: Jan. 17, 1973

[21] Appl. No.: 324,427

Related U.S. Application Data

[60] Continuation-in-part of Ser. No. 100,792, is a division of Ser. No. 634,079, April 27, 1967, Pat. No. 3,595,736.

[30] Foreign Application Priority Data
May 26, 1966   Great Britain.................... 23578/66

[52] U.S. Cl............... 264/210 R, 264/234, 264/288
[51] Int. Cl............................................. B29d 7/24
[58] Field of Search..... 260/75 R, 47 C; 264/210 R, 264/234, 288, 289

[56]              References Cited
              UNITED STATES PATENTS

| | | | |
|---|---|---|---|
| 2,465,150 | 3/1949 | Dickson | 260/75 R |
| 2,556,295 | 6/1951 | Pace | 264/288 |
| 2,578,899 | 12/1951 | Pace | 264/210 F |
| 2,918,696 | 12/1959 | Bottoms et al | 264/289 |
| 2,880,057 | 3/1959 | Cuculo | 264/210 R |

*Primary Examiner*—Jay H. Woo
*Attorney, Agent, or Firm*—Cushman, Darby & Cushman

[57] ABSTRACT

Processes for the production of uniaxially drawn films and tapes of polyethylene-1:2-diphenoxy-4:4'-dicarboxylate in which the film or tape is first crystallised by heating to 80°–220°C and then uniaxially oriented.

6 Claims, No Drawings

PROCESS FOR THE PRODUCTION OF NEW ORIENTED FILM AND TAPES

This application is a continuation-in-part of my application Ser. No. 100 792, filed Dec. 22, 1970 which in turn is a Divisional application of my application Ser. No. 634 079, filed Apr. 27, 1967 now issued as U.S. Pat. No. 3,595,736.

This invention relates to a process for the production of oriented films and tapes of the polyethylene-1:2-diphenoxyethane-4:4'-dicarboxylate which will be designated herein CPE-2G for convenience as it can be considered to be derived from the condensation of 1:2-bis(p-carboxyphenoxy)ethane i.e. "CPE" and ethylene glycol which is termed "2G" in the polyester art.

CPE-2G has been known for many years, thus it was described in Dickson, U.S. No. Pat. 2,465,150; however polyester film and tape production has been concentrated, for a variety of reasons, on polyethylene terephthalate (PET). For many applications thermoplastic films or tapes are required which combine a very high tensile yield strength in the longitudinal direction with sufficient strength in the transverse direction. It is also necessary that such films are dimensionally stable at the temperatures liable to be encountered in use.

If a PET film or tape is uniaxially, i.e. one way, drawn in the solid state such tensile properties may be achieved but the film or tape has poor dimensional stability as it shrinks by a large amount if heated to elevated temperatures.

This shrinkage is normally alleviated in PET film or tape production by "heat-setting" the drawn film by heating the film while it is prevented from shrinking or while a controlled amount of shrinkage is allowed to take place. During this heat-setting step, crystallisation of the polymer takes place, 'locking' the polymer molecules that have been aligned or oriented during the cold drawing process in place. Unfortunately, such heat setting gives rise to a drastic reduction in the tensile properties of the film or tape transverse to the drawing direction and gives a film of low yield strength and low elongation to break in that transverse direction. In use, such films or tapes tend to fibrillate, i.e. split into narrower films or tapes and are thus of little use.

To overcome this tendency to fibrillate, to provide satisfactory films or tapes from PET it has therefore been necessary to impart some orientation in the transverse direction by drawing the film in the transverse direction as well as in the longitudinal direction.

While PET films are generally made in the balanced condition, i.e. the properties in both longitudinal and transverse directions are similar, by drawing by approximately equal amounts in the two directions, see for example Cornforth et al U.S. Pat. No. 3,107,139, processes have also been proposed for making "tensilised" films or tapes having much greater strength in the longitudinal direction, for example see Alles U.S. Pat. No. 2,884,663, Amborski U.S. Pat. No. 2,975,484, Winter U.S. Pat. No. 2,995,779 and Adams et al U.S. Pat. No. 3,177,277. All these processes require drawing in the transverse direction as well as in the longitudinal direction.

However, such processes are complicated, and the necessity for a transverse draw adds to the cost and complexity of the equipment utilised.

I have found that if CPE-2G is used, satisfactory films and tapes may be produced without the need for a transverse direction draw. I have found, however, that a film having a low shrinkage and little tendency to fibrillate may be made if the film is crystallised prior to drawing.

PET that has been allowed to crystallise from the melt by slow cooling is very brittle and tends to break in the drawing apparatus, e.g. as it is passed between nip rollers. If PET is rapidly quenched from the melt to the solid amorphous state e.g. on a casting drum and is then heated to effect crystallisation, it is less brittle and can be drawn. Crystallised CPE-2G film or tape does not exhibit such brittleness to the same extent and can be drawn which ever way it is crystallised.

Surprisingly uniaxial drawing crystallised CPE-2G film or tape gives a product that has low shrinkage in the direction of draw without the need for a heat-setting step. In contrast, uniaxial drawing of PET film that has crystallised gives a product having high shrinkage and so heat-setting is therefore needed to alleviate shrinkage. However, while the non-heat-set drawn films or tapes of PET, whether crystallised or not prior to drawing, show reduced tendency to fibrillate, a heat-setting step restores the tendency to fibrillate.

Because of the necessity to heat-set PET film or tape to alleviate shrinkage, it has, as discussed hereinbefore, been necessary to subject PET film or tape to a biaxial drawing process to overcome the problem of fibrillation. However, biaxial drawing of crystallised PET is difficult to control and so, heretofore, it has been the practice to draw the PET film or tape while it is in the amorphous condition, i.e. before it has crystallised.

According to the present invention I provide a process for the production of films or tapes of CPE-2G in which a layer of undrawn CPE-2G is heated at a temperature in the range 80° to 220°C until the polymer has crystallised and is then drawn in the solid state in its longitudinal direction only to from 2 to 5 times its original length at a temperature of from 70° to 150°C whereby there is produced an unbroken void-free film or tape having a refractive index in its longitudinal direction differing from that of the undrawn layer.

By means of this process it is possible to produce films or tapes which are stiffer and stronger than those produced from polyethylene terephthalate. This allows the use of thinner films or tapes with resultant economy of material and, as is important in applications which involve many superposed layers, e.g. magnetic recording tapes, capacitors or typewriter ribbons, economy of space. Improvements in stiffness and strength also in themselves extend or improve the applications to which film or tape may be put.

Typically the products of the present invention have a longitudinal direction tensile yield strength of at least 20,000 p.s.i., and a modulus in bend of at least $0.8 \times 10^6$ p.s.i., coupled with a tensile yield strength in the transverse direction of at least 3,000 p.s.i. and a shrinkage when heated for 1 minute at 200°C of less than 1 percent, in the longitudinal direction of the film or tape.

In particular the film or tape may have a longitudinal direction tensile yield strength of more than 45,000 p.s.i. and a moduli in bend of more than $1.8 \times 10^6$ p.s.i.

Crystallisation of the film or tape, which may be produced by extrusion from a slot die or, less preferably, from an annular die, is effected by subjecting the film or tape to an elevated temperature. Crystallisation of CPE-2G is rapid and may be effected by heating the film or tape for as little as 2 seconds. I prefer to effect crystallisation by heating for a period of from 3 to 30 seconds although longer times may be utilised if desired. However heating for longer periods, e.g. 60 seconds, will generally not increase the level of crystallinity as, at any particular crystallisation temperature there is a maximum amount of crystallisation that can be induced and this maximum level of crystallinity will generally be achieved within 30 seconds.

While crystallisation temperatures as low as 80°C can be used, I have found that, since the film or tape shows a tendency to fibrillate if heated, after drawing, to a temperature greater than that used to effect crystallisation to give a higher service temperature, I prefer to effect crystallisation by heating at higher temperatures, nearer to the melting point of the polymer (which is about 245°C). This tendency to fibrillation upon heating after drawing to temperatures greater than that used to effect crystallisation is greater, the larger the draw ratio used. Consequently, I therefore prefer to crystallise at temperatures within the range 150°C and 220°C and in particular between 150° and 200°C.

I prefer to quench the film or tape rapidly from the melt temperature of extrusion to give a solid film or tape in the amorphous form and then heat the amorphous film to effect crystallisation. While I prefer that the molten extrudate is cooled to give an amorphous film or tape by quenching at temperatures of the order of those used for quenching PET, e.g. below 80°C or in most cases below 60°C, this is not essential in the present invention. Thus the film may be quenched to a temperature in the range 80° to 125°C whereupon crystallisation of the amorphous film or tape is effected and then the film or tape is preferably heated to 150° to 220°C to induce further crystallinity and to give a higher service temperature.

The crystallised film or tape is then uniaxially drawn while it is in the solid state. Such drawing causes a change in the refractive index of the film or tape in the direction of drawing compared with the refractive index of the undrawn film or tape. The draw ratio should be at least 2:1 in order to give a marked improvement in the film or tape strength. Preferably the draw ratio is at least 4:1. The maximum draw ratio which can be applied without breaking the film or tape depends on the molecular weight of the polymer but for some polymers draw ratios of 5:1 can be achieved to produce film or tape having a tensile yield stress of more than 60,000 p.s.i. and a modulus of more than $2.2 \times 10^6$ p.s.i.

We measure the molecular weight of the polymer by measuring its relative viscosity as a .1 percent solution in o-chlorophenol. We prefer that it has such a relative viscosity of at least 1.7 and particularly one of at least 2.0. Relative viscosities as low as 1.7 are quite satisfactory. However, relative viscosities above 2.5 are not desirable because unduly high extrusion temperatures are required causing some polymer degradation and also because the cost of producing the polymer is increased.

The maximum draw ratio also depends on the drawing temperature and rate of drawing. The crystallised films or tapes require a lower draw ratio, compared with drawing of non-crystallised films or tapes, to effect an equal degree of orientation as shown by change of refractive index in the direction of drawing and by improvement in the tensile strength of the films or tapes. Under comparable conditions the crystallised films or tapes can only be drawn to somewhat lower draw ratios than uncrystallised films or tapes without breaking. However, the crystallised films or tapes can be drawn, in accordance with the invention, to give products having greater tensile yield strengths and stiffness compared with uncrystallised films or tapes.

The drawing temperature may be as low as 70°C and at normal commercial rates of drawing as practised in PET film or tape production, temperatures as low as this give void-free products. However, the higher the rate of drawing, the higher the draw temperature necessary to obtain a void-free film or tape. If higher drawing rates are used, voids may be formed unless the drawing temperature is also increased. For higher drawing rates, a temperature of at least 80°C may be necessary. If the film or tape is drawn at an unduly high temperature e.g. at a temperature of the order of 180°C, the solid polymer flows as well as orients with the result that the change in refractive index in the draw direction, and the improvement in mechanical properties, is less than would be expected at that draw ratio. For this reason, the draw temperature should be below 150°C. I prefer to use draw temperatures in the upper part of the draw temperature range to achieve the highest throughputs.

The films and tapes are preferably of the non-tubular variety and are preferably made by non-tubular processes although they could be made by slitting seamless tubular film made by a tubular process.

For the operation of a tubular process a cooling die would normally be required because of the mobile nature of the polymer melt. However, because tubular processes are not best suited to the process of the present invention and because, in any case, they do not give the best thickness uniformity and flatness, the films and tapes are preferably prepared from flat layers by drawing, e.g. between sets of 'fast' and 'slow' rollers. Narrow tapes may be produced by slitting a relatively wide, oriented, film but such narrow tapes may also be produced by extrusion of a narrow undrawn tape or by extrusion of a relatively wide film which is first slit and then drawn to produce a plurality of narrow, drawn tapes. These methods are also very suitable for the production of transparent film or tape particularly when the layers formed for drawing are quenched after extruding at relatively high extrusion temperatures, e.g. from 300° to 330°C, preferably from 310°–315°C.

The films or tapes exhibit good resistance to ultraviolet light degradation compared with PET films or tapes. For example the tensile yield stress of the film was only reduced to 85 percent of its initial value after exposure to ultra-violet light for 1,000 hours whereas the tensile yield stress of PET film under the same conditions was reduced to 50 percent of its initial value.

The films and tapes also exhibit resistance to continued exposure to high temperatures and, for example, after 8 days at 170°C had only lost 30 percent of their original tensile yield strength.

Various additives, e.g. fillers comprising finely divided particulate materials, dyes, pigments, light stabilisers or antistatic agents, may be incorporated in the films or tapes according to our invention. Examples of suitable fillers include titanium dioxide, silica (including diatomaceous silica), silicates and alumino-silicates, e.g. clays, abrasives such as powdered glass or carborundum and decorative materials such as talc, ground mica or ground mother-of-pearl.

The concentration of the additive and, in the case of solid materials, its particle size, will depend on the nature of the additive and the purpose for which the film or tape is to be used. For example, in the case of a pigment or dye we prefer the concentration to be from 0.01 percent to 5.0 percent by weight. In the case of a filler such as silica or a silicate which confers a matte "write-on" surface to the film or tape, from 1 percent to 10 percent by weight and of particle size from 0.1 to 10 microns may be added. In the case of a substance, e.g. clay, added to improve the slip properties of the film or tape, the preferred concentration is from 0.05 percent to 5.0 percent by weight and the preferred particle size from 0.01 to 10 microns. In the case of decorative materials the preferred concentration of inert filler is from 1 percent to 15 percent by weight and the preferred particle size from 1 to 20 microns. In the case of abrasives, e.g. ground glass or carborundum, concentrations of from 1 percent to 15 percent by weight and particle sizes of from 0.005 inch to 0.100 inch may be used. For applications where the film or tape is subjected to violent mechanical action, e.g. stamping or creasing, I prefer to use from 0.25 percent to 10 percent by weight of a filler having a particle size range of from 0.1 to 2.0 microns and a very narrow distribution of particle size, e.g. titanium dioxide of particle size approximately 0.2 microns.

The films or tapes may also be laminated to other materials which may or may not be themselves in the form of films. For example, they may be laminated to wood, to paper, to metals or to other thermoplastics.

The films or tapes so laminated may or may not contain any of the additives listed above and a particularly useful type of laminate is one in which a film or tape made according to the present invention and containing no additive is laminated to a second film which may be of CPE-2G, of another polyester, e.g. PET, or of any other thermoplastic material, which second film contains such an additive. The effect of the additive may thus be obtained without necessarily incurring possibly undesirable other effects, e.g. a matte surface giving good write-on surface or surfaces may be obtained without unduly reducing transparency by laminating an unfilled film or tape so that it forms the central layer between two filled films or tapes according to our invention.

A further very useful class of laminates are those with thermoplastic materials which are heat sealable. Examples of such laminates are those with polyethylene, polyvinyl acetate, partially hydrolysed polyvinyl acetate, vinyl chloride/vinyl acetate copolymers, ethylene/vinyl acetate copolymers, butadiene/methyl methacrylate copolymers, butadiene/methyl methacrylate/styrene copolymers and methyl methacrylate/methacrylic acid copolymers. A further group of thermoplastics which when laminated with the CPE-2G films or tapes confer not only heat sealability but also impermeability to water vapour and other gases include copolymers of vinylidene chloride with one or more of acrylonitrile, itaconic acid, acrylic acid or vinyl chloride. Any of the above heat sealable thermoplastics when laminated to the CPE-2G films or tapes may of course contain any of the additives listed above but antistatic agents (cationic, anionic or nonionic), antioxidants, dyes, pigments, lubricants, anti-blocking agents, ultra-violet light stabilisers and slip stabilisers and slip agents (finely divided solids or waxes) are among those additives which may conveniently be added to the heat sealable thermoplastic.

The film or tapes may also have their surface modified, e.g. by the application of a very thin coating of heat sealable, antistatic or an ultra-violet light stabilising material (although because of their high stability to ultra-violet light this is seldom required) or by the application of a slip coating comprising particulate material, e.g. of silica or alumino silicates, or of thermoplastic polymers such as polyvinyl chloride or polymethyl methacrylate. Slip coatings of polymethyl methacrylate of particle size 0.1 microns to 2.0 microns are particularly useful since they increase the slip of the film or tape without markedly increasing its haziness. The surface may also be modified by embossing, by mechanical roughening or by sand blasting. Very thin reflective coatings of a metal such as aluminium may also be formed on the surface of our films or tapes. Such metallic coatings may range in thickness from $10^{-7}$ to $10^{-6}$ inches.

The methods used in the production of filled, laminated and surface modified films or tapes will now be described.

Fillers and other additives which do not undergo any chemical reaction with the polymer or polymer-forming reactants may preferably be incorporated into these materials and the resultant composition extruded to give the additive-containing film or tape. Such a procedure, especially when applied at the polymerisation stage leads to a more uniform dispersion of the additive in the film or tape. Laminates comprising an outer layer or layers containing an additive may be produced by the extrusion through a multi-channel die in which polymer containing additive is fed to one or more channels and polymer without additive to the remaining channels. Such a film or tape and process for its production is described in Duffield U.S. Pat. No. 3,515,626.

Laminates may be formed by first treating the films or tapes with an adhesive such as low molecular weight polyesters and copolyesters used either alone or in conjunction with an isocyanate, and then applying an already formed film of the heat sealable thermoplastic material with the accompaniment of heat and pressure, e.g. between hot nip rollers. Such a process may conveniently be used in laminating the films or tapes to films of polyethylene or polypropylene, or to metallic foils, e.g. of tin or aluminium.

An alternative method of laminating the films or tapes to thermoplastic materials and particularly to heat sealable thermoplastic materials is to apply the material to the CPE-2G film or tape as a melt coating, from a solution or from aqueous dispersion. Although the adhesion of such coatings to the oriented CPE-2G films or tapes is high it may be necessary for particular coatings to pretreat the surface of the oriented film or tape to render it more receptive to the coating and thus produce a stronger adhesion between the base film and the heat seal coat. This may be done by a surface oxidation of the film or tape, e.g. by chemical oxidation with for example potassium dichromate, chloracetic acid or ozone, by flame treatment of the surface of the film or tape (with or without causing any melting of the film surface), or by corona discharge treatment in air or in another gas or mixture of gases, e.g. chlorine, sulphur dioxide or ozone. Thin coatings of a primer may be applied, e.g. alkyl titanates or polyalkylene imines.

One very effective method of obtaining an oriented film or tape, the surface of which is more receptive to a heat seal coating, is to apply to the unoriented film or tape a coating of a thermoplastic polymer at least 50 times thinner than the thickness of the unoriented film or tape, the thermoplastic polymer having a melting point lower than the orientation temperature and having at least one carbon atom with a polar substituent per every six carbons of the polymer chain. Such a process is described in British Pat. No. 1,127,076 and this process may also be used to apply antistatic agents, ultra-violet stabilisers, antioxidants or slip coats to the films or tapes, or to improve their receptivity to dyes or printing inks over the already good characteristics which they have in this regard without such treatment.

To avoid pretreatment of the oriented film or tape prior to heat seal coating, the coating may be applied to the unoriented film or tape and then the orientation of the film or tape carried out. This leads to an excellent adhesion between the film or tape and the heat seal coat.

A further method of treating the films or tapes in order to make them more readily heat sealable is to subject their surface to a flame treatment which may be carried out by passing the oriented film or tape to be treated over a chilled roller while applying a flame or intense heat to the upper surface of the film or tape for a sufficient time to cause the surface of the film or tape to melt but for insufficient time to cause distortion of the film or tape. The film or tape following this treatment has an amorphous layer on the surface and can thus be heat sealed at a temperature of from 160°C to 230°C and using a pressure of 5 p.s.i. for 2 seconds give heat seal strengths of from 70 to 200 g/inch.

The increased modulus and yield strength of the films or tapes allows them to be successfully used for many applications in thicknesses considerably less than those employed for PET film or tape. In the following examples of uses for our films, which may be from 5 to 10,000 gauge thick, "gauge" means a unit of $10^{-5}$ inches.

They are particularly useful in the production of magnetic recording sound and video tapes in thicknesses as low as 25 gauge or even 5 gauge.

The films and tapes may be used in electrical applications, for which they are particularly suitable since they have a high permittivity, for example in the production of capacitors for which film or tape generally of less than 100 gauge is used and in the case of very small capacitors which are increasingly being used in the electronics industry of thicknesses as low as 5 gauge. The films or tapes used for capacitors may contain fillers to improve their slip and so the ease of wrapping and a particularly suitable filler is titanium dioxide of particle size less than 1 micron. They may be used for cable lapping, for which a requirement is a high yield stress and film or tape of our invention of thickness as low as 10 gauge may be used in this application. They may be used in the production of other electrical and electronic components such as for example coil formers or in the production of chokes, coils and relays in which the film or tape forms an interlayer between the various windings of the electrical component. Another example of this type of use is in interphase insulation in polyphase electrical machines, e.g. three-phase electrical motors. Thicker films or tapes, e.g. from 500–2,000 gauge, may be used for slot liners which are to be used at higher temperatures, because of the high resistance of our films and tapes to continued elevated temperature as compared with polyethylene terephthalate. Laminates between the present films or tapes and paper, and synthetic fibres, e.g. PET fibre, may be used for slot liners and slot closures in applications which require even higher working temperatures than does a small (one-half h.p. and less) electric motor, e.g. up to 155°C and laminates with glass fibre or with mica may be used in applications where temperatures up to 180°C may be encountered. They may also be used in the production of printed circuits which may be used for example in the wiring of motor vehicles and in other applications in which it is desirable to have a flexible printed circuit unit. A similar application is in the production of ribbon cables which allow wiring to be placed, e.g. behind wallpaper. They may also be used in the production of insulating or other tapes which may be coated with an adhesive or a pressure sensitive adhesive and in the production of corrugated or embossed film or tape which latter is useful in the case of film or tape less than 200 gauge thick, e.g. in cable lapping since the corrugations or irregularities of the surface reduce any slippage between layers of the lapping which may occur on bending of the cable, and in winding of transformers which are then soaked in a varnish to increase the mechanical strength since the varnish can then permeate through the capillaries formed between successive layers of the embossed or corrugated film or tape.

The CPE-2G films can be used for lining hoses to impart chemical resistance to the hose. Such hoses are resistant to alkali as well as acid and thus represent an improvement over hoses lined with polyethylene terephthalate which is not particularly resistant to alkali. They may be used in the production of webbing, e.g. for upholstery or basket making and when perforated they can be used as a leather substitute, e.g. in the production of shoes, handbags and other leather-substituted goods. The perforated films may also be used in the production of surgical dressings.

They may be used in packaging, in thin gauges (e.g. 5–200 gauge) as tear tapes and, particularly in thick gauges e.g. from 750 gauge to 10,000 gauge (0.10 inch) as strapping tapes. They are also particularly suited for twist wrapping. They can be used for producing adhesive tapes and labels. They may be laminated to printed paper, e.g. to give weather-proof maps. Metallised film or tape may be used for many of the applications mentioned above and is particularly useful in producing labels and adhesive tapes, decorative laminates, e.g. with wood, paper or other plastics. For example a metallised film may be laminated to a formed strip of PVC and used as a replacement for chrome strip, e.g. in surrounding car windscreens. A particularly preferred use for metallised film or tape is as thin tapes or threads which can be woven into fabric to produce decorative effects. Metallised film or tape may also be used in the production of stamping foils in which the base film or tape is coated first with a release coating, then metallised, then coated with an adhesive which can be activated by heat; this laminate is then placed on the surface to be treated and heat applied to the desired part of the film or tape; when the laminate is stripped from the surface to be treated the metallised layer remains only over those parts which were heat treated. The process is used in particular in the process of gold lettering but it may also be used for any other metal or other material which can be deposited as a thin layer on to the film or tape.

The films may also be used as a printing base, e.g. in silk screen printing. For photographic applications, the low shrinkage of the CPE-2G film is particularly useful. They may be used in book binding. They may be used as a base for carbon paper or for typewriter ribbons and owing to the high yield stress can be used in this application in thinner gauge than heretofore possible with polyethylene terephthalate film, thus allowing a longer length of film to be wound on a standard diameter roll of typewriter ribbon or for use in high speed printing heads, e.g. those attached to a computer where high tensile yield strengths are important. They may also be used for the punch tape to be fed to a computer or they may be used for ticker tape. They may be used in the form of a strip or discs to reinforce the holes in loose-leaf paper.

In the form of relatively thick sheets, i.e. 750–10,000 gauge (0.1 inch) they may be used for constructional panels and facing panels, e.g. in furniture, household appliances and vehicles, especially where particular strength is required in one direction.

The following examples illustrate but in no way limit the invention.

In these examples the CPE-2G polymer was extruded through a slot die, maintained at 313°C, fitted to a 1¼ inch Iddon extruder. The resulting film was quenched to a film surface temperature of about 20° to 25°C on a water cooled metal roller immediately after extrusion from the die. Two different polymers were used, having relative viscosities (as 1 percent solutions in o-chlorophenol) of 1.96 and 2.11 respectively. The quenched films made from these polymers were referred to as Films A and B respectively.

EXAMPLES 1 to 6

In these examples Film A or Film B (which were 640 gauge thick) were passed over hot rolls and so heated to 90°C for 25 seconds. The film was then drawn at relatively low draw rates of from 48,000 to 100,000 percent per minute and at a temperature of 80°C to the extents shown in the following table and its properties measured with the results which are also shown in the table.

The transverse tensile yield stress of the film of Example 6 (which had the highest longitudinal yield stress) was 4,400 p.s.i. compared with a transverse yield stress of the unoriented film B of 7,000 p.s.i.

EXAMPLE 7

To ascertain the service temperatures the films produced in Examples 1 to 6 were subjected to elevated temperatures for 5 minutes and their behaviour noted.

All the films fibrillated after heating but while those produced in Examples 5 and 6 (draw ratio 5:1) fibrillated at 90°C and that from Example 3 fibrillated at 100°C (draw ratio 4:1), temperatures in excess of 180°C were required to fibrillate the films from Examples 1 and 2.

EXAMPLES 8 to 10

Film B was heat treated at 180°C for 30 seconds and then drawn at a temperature of 150°C to draw ratios 3.7:1, 4.1:1 and 4.7:1. The properties of the films obtained are set out in the following table.

| Example No. | Draw Ratio | Longitudinal Modulus (p.s.i.) | Longitudinal Yield Stress (p.s.i.) | Shrinkage (%) after 1 min. at 200°C |
| --- | --- | --- | --- | --- |
| 8 | 3.7:1 | $1.5 \times 10^6$ | 35000 | <0.5 |
| 9 | 4.1:1 | $1.5 \times 10^6$ | 38000 | <0.5 |
| 10 | 4.7:1 | $2.0 \times 10^6$ | 44000 | <0.5 |

When heated to 120°C for 5 minutes, none of the films produced in Examples 8 to 10 showed any tendency to fibrillate.

EXAMPLE 11

The film B was heat treated at 180°C for 30 seconds and then drawn at a temperature of 130°C to a draw ratio of 3.5:1. The drawn film had a longitudinal yield stress of 40,000 p.s.i. and when heated for 1 minute to a temperature of 120°C, showed no tendency to fibrillate.

EXAMPLES 12 to 14

The film B was heat treated at 120°C for 30 seconds and drawn at various temperatures and draw ratios as shown in the following table.

| Example No. | Draw Temperature °C | Draw Ratio | Longitudinal Yield Stress (p.s.i.) |
| --- | --- | --- | --- |
| 12 | 230 | 2.5:1 | 25000 |
| 13 | 220 | 3.5:1 | 30000 |
| 14 | 200 | 4.0:1 | 45000 |

The films produced in Examples 12 to 14 showed no tendency to fibrillate when heated to 120°C for 5 minutes.

| Example No. | Film | Draw Ratio | Thickness (Gauge) | Longitudinal Modulus (p.s.i.) | Longitudinal Yield Stress (p.s.i.) | Shrinkage (%) after 1 min. at 200°C |
| --- | --- | --- | --- | --- | --- | --- |
| 1 | A | 2.4:1 | 290 | $1 \times 10^6$ | 24000 | <0.5 |
| 2 | A | 3:1 | 250 | $1.4 \times 10^6$ | 30000 | <0.5 |
| 3 | A | 4:1 | 240 | $1.7 \times 10^6$ | 45000 | <0.5 |
| 4 | A | 5:1 | — Film Ruptured — | | | |
| 5 | B | 5:1 | 180 | $2.3 \times 10^6$ | 55000 | <0.5 |
| 6 | B | 5:1 | 180 | $2.3 \times 10^6$ | 66000 | <0.5 |

EXAMPLE 15

By way of comparison an extruded and quenched PET film of intrinsic viscosity 0.59 measured on a 1 percent solution in o-chlorophenol at 25°C (which corresponds approximately to a relative viscosity of 1.7) was crystallised by heating at 180°C for 1 minute. By measurement of density and by X-ray diffraction its crystallinity was 37 percent. The crystallised film was then drawn at 150°C to a draw ratio of 3.5:1. The tensile breaking stress of the drawn film in the direction of drawing was 42,000 p.s.i. and the elongation at break was 72 percent. (The longitudinal yield stress was 35,600 p.s.i. and the longitudinal elongation at yield was 11 percent). The elongation at break in the transverse direction was 400 percent and the film did not fibrillate. However, on heating a sample of the film to 200°C for 1 minute, the film shrank 17 percent in the direction of drawing.

If the drawn film was heat-set by heating to 200°C while restraining shrinkage, the film fibrillated.

Similar results were obtained when a draw ratio of 4.0:1 was used. In this case the tensile breaking stress, of the non-heat-set film, in the longitudinal direction was 60,000 p.s.i., and the elongation at break was 10 percent. The elongation at break in the transverse direction was 734 percent again showing the film does not fibrillate but the shrinkage on heating at 200°C for 1 minute was 20 percent.

Again the film fibrillated after heat-setting.

I claim:

1. A process for the production of films or tapes of polyethylene-1:2-diphenoxyethane-4:4'-dicarboxylate in which a layer of undrawn polyethylene-1:2-diphenoxyethane-4:4'-dicarboxylate is heated at a temperature in the range 80° to 220°C until the polymer has crystallised and is then drawn in the solid state in its longitudinal direction only to from 2 to 5 times its original length at a temperature of from 70° to 150°C whereby there is produced an unbroken void-free film or tape having a refractive index in its longitudinal direction differing from that of the undrawn layer.

2. A process as claimed in claim 1 wherein crystallisation is effected at a temperature within the range 150° to 220°C.

3. A process as claimed in claim 1 wherein the layer of poly-1:2-diphenoxyethane-4:4'-carboxylate is produced by melt extruding poly-1:2-diphenoxyethane-4:4-dicarboxylate from a slot die and quenching the extrudate to form said undrawn amorphous film or tape which is then heated to effect crystallisation.

4. A process as claimed in claim 1 wherein the drawing temperature is at least 80°C.

5. A process as claimed in claim 1 wherein the undrawn layer is drawn to at least 4 times its original length.

6. A process as claimed in claim 1 in which the poly-1:2-diphenoxyethane-4:4'-dicarboxylate has a relative viscosity, as measured on a 1 percent solution in o-chlorophenol of between 1.7 and 2.5.

* * * * *